March 17, 1970 H. ODEN ET AL 3,501,595
DISCONNECTION OF ABSENTEE SERVICE IN TELEPHONE EXCHANGES
Filed March 29, 1966
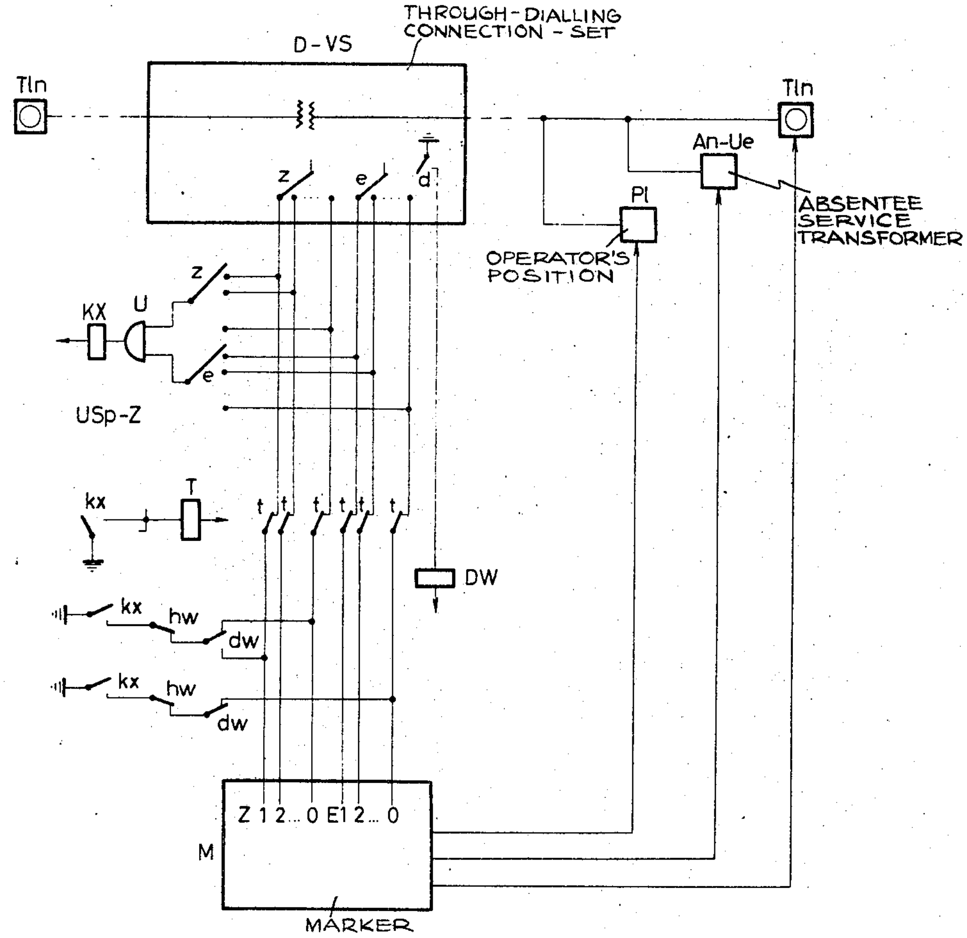

United States Patent Office 3,501,595

Patented Mar. 17, 1970

3,501,595
DISCONNECTION OF ABSENTEE SERVICE IN TELEPHONE EXCHANGES

Hoeckley Oden, Korntal-Wurttemberg, and Herbert Siegel, Munchingen, Germany, assignors to International Standard Electric Corporation, New York, N.Y., a corporation of Delaware Filed Mar. 29, 1966, Ser. No. 538,265
Claims priority, application Germany, Apr. 15, 1965, St 23,698
Int. Cl. H04m 3/60
U.S. Cl. 179—18 4 Claims

ABSTRACT OF THE DISCLOSURE

An arrangement is provided in a PBX by which individual extensions can be provided with internal absentee service. As a part of the arrangement, if a terminating call reaches an extension which is switched for such absentee service, the terminating call is automatically advanced to the operator's position.

The invention relates to the disconnection of absentee service in a telephone private branch exchange upon the receipt of terminating through-dialling connections.

It is known for centrally controlled exchange systems to give authorized subscribers or extensions the possibility to switch their sub-station or extension station to absentee service. When calling a subscriber station switched to the absentee service the calling party is connected with an absentee service device or an absentee service repeater, receiving a predetermined answer or an answer recorded by the called subscriber himself. The calling party thereby obtains information during periods the subscriber called cannot be reached. This switch-over to absentee service can be initiated by the subscriber. To this end he dials a defined control command designating the kind of absentee service desired.

If such switching-over to absentee service is provided in a PBX the switch-over to absentee service may preferably be limited to internal traffic. The terminating through-dialling connections in such a case would automatically be switched over to the operator's position in the event a called extension has been switched to absentee service.

It is an object of the invention to improve switching-over to absentee service in telephone private branch exchanges in such a way that it will be effective only for internal traffic. Terminating through-dialling connections will be automatically connected to the operator's position.

A method for cancelling the absentee service line in telephone systems, particuraly private branch exchanges, at terminating through-dialling connections is characterized, according to the invention, in that at terminating through-dialling connections a special criterion is transferred to the switch-over storage, controlling the switch-over to absentee service which initiates the switching-over to the operator's position. In this manner the switch-over to absentee service in case of terminating through-dialling connections can be cancelled in an easy way and the call can be through-connected to the operator's position. The special criterion can be derived, according to the invention, most simply directly via the through-dialling connection set, seized at terminating through-dialling connections in private branch exchanges. The switch-over storage controlling the switch-over is inserted, as proposed already, between the through-dialling connection set or register and the marker. The switch-over storage receives the setting address, transmitted on the control leads to the marker. The setting address applied to the control leads leading over the switch-over storage is checked on coincidence with the switch-over addresses stored. If a switch-over order to absentee service is determined for a setting address, furnished by the through-dialling connection set, the control leads to the marker are interrupted and the marker receives a new setting address for the absentee service announcement to be connected and the respective connection is made.

If the call concerns a terminating through-dialling connection the switch-over to absentee service is made ineffective by the through-dialling connection set via a special criterion and the marker receives the setting address for the operator's position. The terminating through-dialling connection is thereby automatically advanced to the operator's position of the PBX at called subscribers or extensions switched to absentee service.

The invention is in detail explained with the aid of the accompanying drawing.

The calling subscriber reaches, via the connection path established, finally a through-dialling connecting set D–VS of a PBX. This PBX has a switch-over storage USp in the rows USp–Z in which the various switch-over commands are stored. In the most simple case it is the call number of the called extension of the PBX. If in the through-dialling connection set D–VS the address of an extension switched to absentee service arrives, the coincidence of the information is determined in the corresponding row USp-Z of the switch-over storage. This coincidence is determined via the corresponding storage contacts *e* and *z* of the coincidence circuit U with the following switching means KX. Each switch-over command corresponds to a defined setting of contacts *e* and *z*, and a separate coincidence circuit U with a succeeding switching means KX.

If coincidence has been determined, a disconnecting relay T is energized which disconnects the control leads arriving from the through-dialling connection set D–VS. The control leads advancing to the marker M receive another setting address if a random coincidence circuit responds, which address is used by the marker M to through-connect the seized through-dialling connection set D–VS to a defined absentee service transformer An–Ue or similar device. As a terminating through-dialling connection is concerned here, the setting address to the marker is again changed from the through-dialling connection set D–VS through the special criterion relay DW, so that the seized through-dialling connection set D–VS is switched over to the operator's position PL. The special criterion via switching means DW becomes effective only, if an extension, having been switched to absentee service, is dialled and the switch-over to absentee service must be prevented. This is indicated by the contacts *kx*, *hw* and *dw* influencing the advancing leads. If coincidence occurs, the setting address to the absentee service transformer An–Ue becomes effective, if no through-dialling connection set D–VS participates in establishing the connection. The switching means DW of the switch-over storage remains inoperative. The marker M receives the setting command 00. If, on the other hand, the switching means DW responds at terminating through-dialling connections, an address, switched to absentee service is rerouted to the operator's position. The contacts *dw* cancel the setting address of the switch-over storage and the marker receives the setting address, e.g. Z1, which leads to switch-over the connection to the operator's position PL.

While the principles of the invention have been described above in connection with specific apparatus and applications, it is to be understood that this description is made only by way of example and not as a limitation on the scope of the invention.

What is claimed is:

1. In a telephone exchange incorporating absentee service circuits under control of a subscriber, means for routing terminating through-dialling connections to an operator's position, said means including a through-dialling connection set a switch-over storage unit and switching means for connecting a calling party to the operator's position, said switch-over storage unit including means for determining when a call is a terminating call originating from outside the system and providing a signal to operate said switching means accordingly, said switching means responding to the signal to provide a control for said switch-over storage unit, and said switch-over storage unit responding to said control to initiate the switching-over to the operator's position.

2. In a telephone exchange incorporating absentee service circuits under control of a subscriber as claimed in claim 1, a marker, and means including control leads connecting said switch-over storage unit between the through dialling connection set and the marker.

3. A circuit as claimed in claim 2, in which:

a setting address is provided by the through-dialling connection set for application to the marker, a coincidence circuit is provided in the switch-over storage unit to receive said setting address and compare it with addresses of subscribers using absentee service circuits, and means are connected to said coincidence circuit for sensing coincidence and, in response to coincidence, disconnecting said marker from said through-dialling connection set.

4. A circuit as claimed in claim 2, in which the switch-over storage unit includes relay contacts operable by said switching means, said relay contacts functioning in response to operation of the switching means to provide a switch-over on the control leads to provide a setting address by way of the marker to the operator's position.

References Cited

UNITED STATES PATENTS 3,014,989 12/1961 Smith -------------- 179—18

FOREIGN PATENTS 1,134,423 8/1962 Germany.

KATHLEEN H. CLAFFY, Primary Examiner

T. W. BROWN, Assistant Examiner

U.S. Cl. X.R.

179—27